United States Patent

Lacotte et al.

[11] Patent Number: 4,482,803
[45] Date of Patent: Nov. 13, 1984

[54] OPTICAL SENSOR FOR FOCUSING CONTROL

[75] Inventors: Jean-Pierre Lacotte; Bernard Fichot; Gilles Troude, all of Paris, France

[73] Assignee: Thomson-CSF, Paris, France

[21] Appl. No.: 360,664

[22] Filed: Mar. 22, 1982

[30] Foreign Application Priority Data

Mar. 24, 1981 [FR] France .................. 81 05854

[51] Int. Cl.³ .............................. G01J 1/20
[52] U.S. Cl. ........................ 250/201; 369/45
[58] Field of Search ........... 250/201, 204; 350/447, 350/255, 518; 369/45, 46; 354/25 A, 25 R

[56] References Cited

U.S. PATENT DOCUMENTS

| | | | |
|---|---|---|---|
| 3,983,317 | 9/1976 | Glorioso | 178/6.6 R |
| 4,025,949 | 5/1977 | Whitman | 250/201 |
| 4,079,247 | 3/1978 | Bricot et al. | 250/201 |

Primary Examiner—David C. Nelms
Assistant Examiner—Ernest Austin, II
Attorney, Agent, or Firm—Oblon, Fisher, Spivak, McClelland & Maier

[57] ABSTRACT

An optical sensor for delivering error signals in order to control focusing of a lens on a movable recording medium or optical memory and more particularly a videodisk comprises a laser for producing a beam which is focused at a point $S_1$. The divergent beam which proceeds from the point $S_1$ is reflected from the face AB of a prism and is focused at a point $S_2$. If the point $S_2$ is located in the plane of the movable recording medium or so-called memory plane, the beam reflected from the memory plane is autocollimated and passes back through the focusing lens. A part of the beam enters the prism through the face AB, then emerges through the face AC and a circular light spot is formed in the plane corresponding to the circle of least confusion. If the point $S_2$ is not located in the memory plane, the light spot is deformed and these deformations are detected by four juxtaposed cells placed in the plane of the circle of least confusion.

6 Claims, 2 Drawing Figures

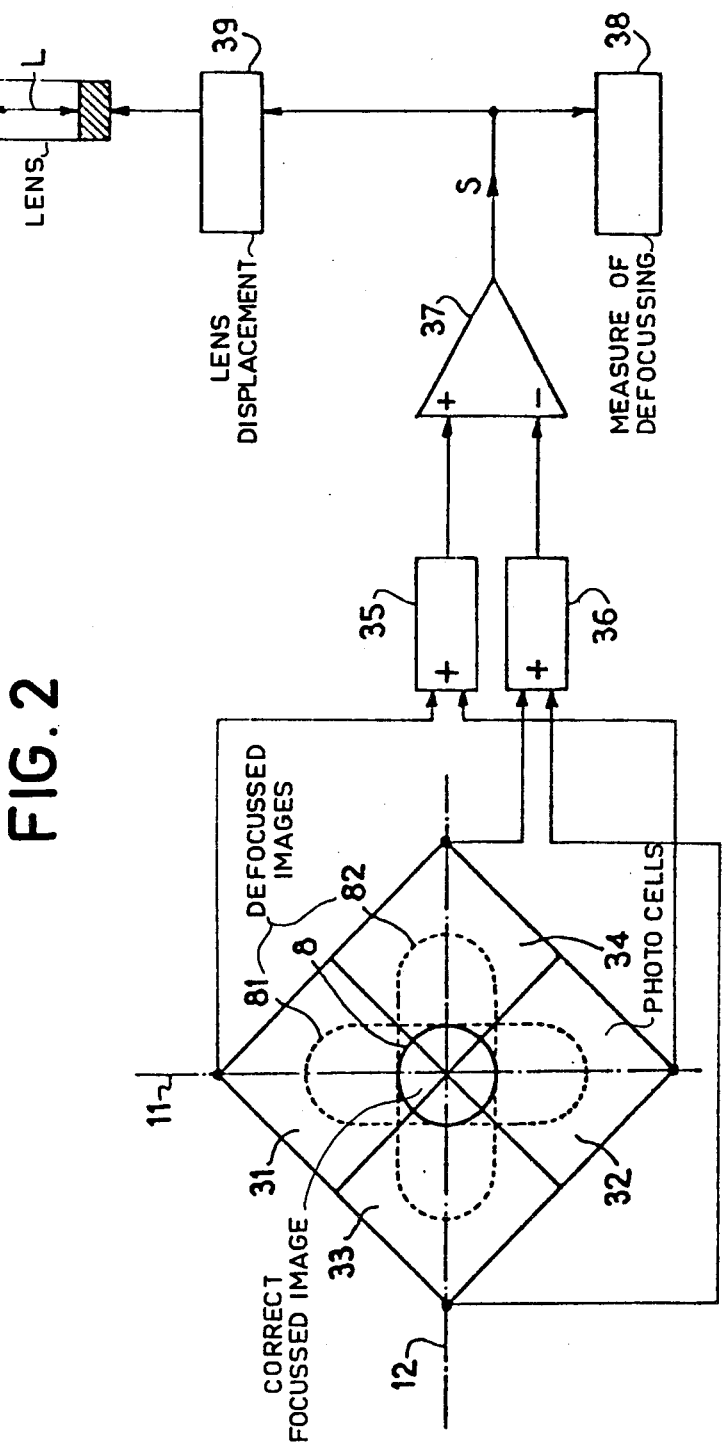

OPTICAL SENSOR FOR FOCUSING CONTROL

BACKGROUND OF THE INVENTION

This invention relates to an optical sensor which delivers signals representing errors of focusing of an optical system on a surface. These signals are employed for controlling the lens-to-image distance of the optical system which is thus made dependent on correct focusing.

This invention applies more particularly to optical reading of information on a movable recording medium and especially a videodisk.

For these applications, the depth of field of the optical focusing system is of the order of one micron and it is therefore essential to correct errors relating to the lens-to-image distance of the optical system and caused by the motion of the recording medium.

As disclosed in U.S. Pat. No. 4,079,247, it is a known practice to utilize part of the optical beam reflected from the recording medium for the purpose of obtaining an astigmatic beam by means of a cylindrical lens after the reflected beam has passed through the focusing lens. Four juxtaposed cells forming a square are placed in the plane corresponding to the circle of least confusion in which a circular light spot is present if focusing is correct. In the event of defocusing, the spot undergoes deformation which is detected by the signals of the four cells. There is thus obtained an error signal which is amplified and produces action on the control motor for adjusting the lens-to-image distance.

In accordance with the cited patent, the reading signal can also be, the obtained from the signals delivered by the cells.

BRIEF SUMMARY OF THE INVENTION

The present invention offers an advantage over the prior art which has thus been briefly described in that the system for producing astigmatism and reflection of the reflected beam from the recording medium is designed in the form of a single optical element consisting of a prism. In comparison with the prior art, this design permits simplified construction of the optical sensor.

In brief outline, the invention relates to an optical sensor which serves to control the position of a lens L for focusing an optical beam on a movable recording medium, a part of the beam reflected from said medium being caused to pass back through said lens and to pass through an optical element which makes said reflected beam astigmatic. Four juxtaposed cells are placed in the plane of the circle of least confusion of said astigmatic beam. The distinctive feature of the invention lies in the fact that the optical element aforesaid is a prism and in the fact that an error signal for correcting the lens-to-image distance is obtained from the signals delivered by the four cells.

BRIEF DESCRIPTION OF THE DRAWINGS

These and other features of the invention will be more apparent upon consideration of the following description and accompanying drawings, wherein:

FIG. 2 is a diagram of reception and focusing control.

DETAILED DESCRIPTION OF THE PREFERRED EMBODIMENT

Figure 1:
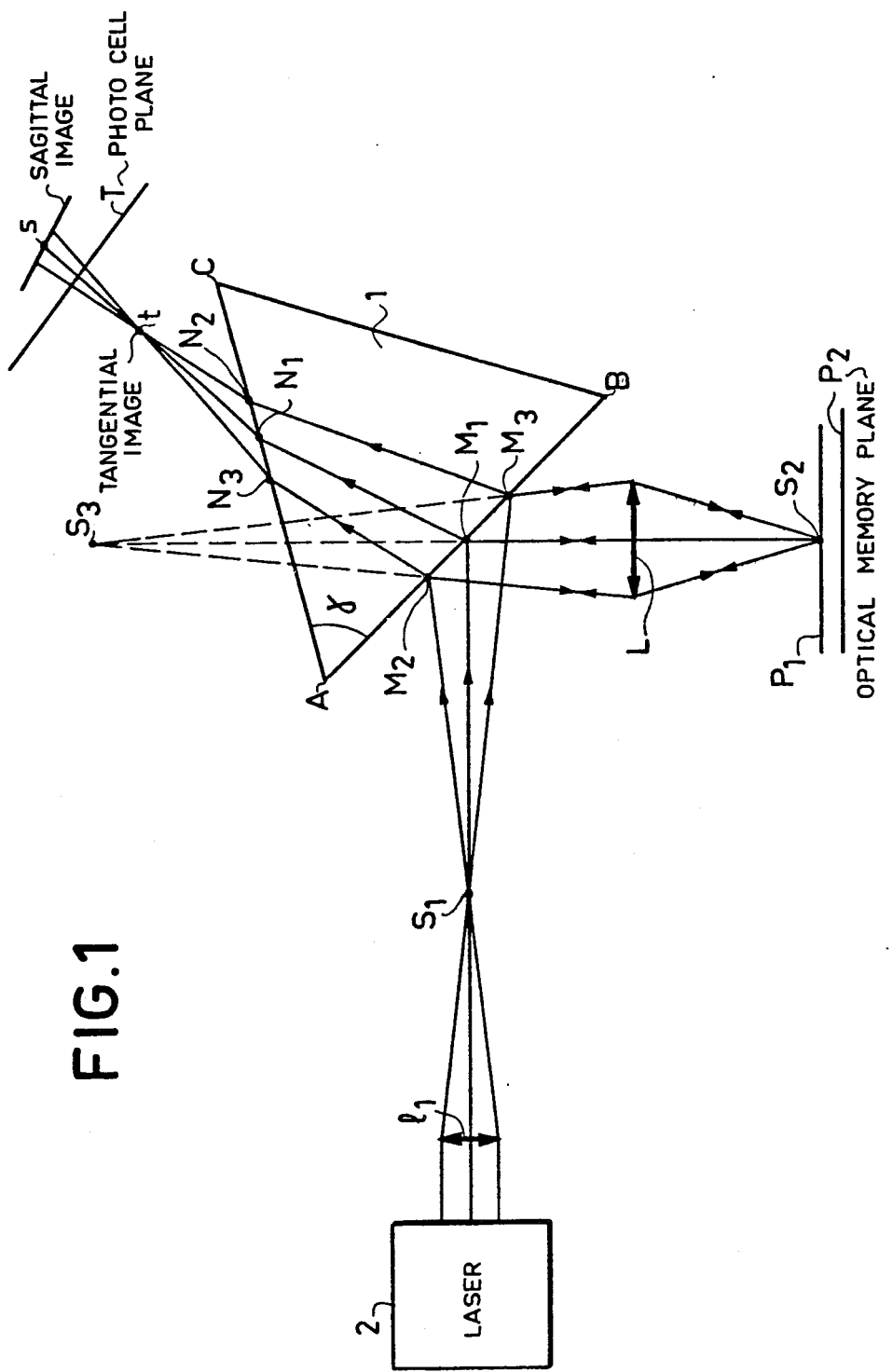
FIG. 1 is an optical diagram of the sensor according to the invention.

As shown in FIG. 1, an optical source 2 preferably consisting of a laser delivers a parallel beam which is focused at the point $S_1$ by an object-lens $l_1$. The divergent beam emerging from the point $S_1$ is incident on a prism 1. The apexes of the triangle of the principal section of the prism 1 are designated by the letters A, B and C.

FIG. 1 shows the axial ray and the two end rays located in the principal section plane of the prism, and the points of incidence $M_1$, $M_2$ and $M_3$ of said rays on said prism. A part of the beam is reflected from the face AB, falls on the focusing lens L which forms the image of the point $S_1$ at $S_2$. In order to ensure good reading, the point $S_2$ must be located in the memory plane $P_1$. In this case the beam reflected from the memory plane $P_1$ is autocollimated as it passes back through the lens L. An autocollimated component of the beam is reflected from the face AB and may be utilized for reading if necessary. This information reading system is not shown in the drawings since it is already known in the prior art.

The virtual focal point $S_2$ of the beam reflected from the recording medium is marked on the figure. Said point $S_2$ is symmetrical with the point $S_1$ with respect to the face AB of the prism.

One component of the beam reflected from the recording medium enters the prism 1 through the face AB and the other component is reflected therefrom. The component transmitted through the prism 1 passes out through the face AC. There are shown in the figure three rays $M_1N_1$, $M_2N_2$ and $M_3N_3$. The beam which emerges through the face AC is astigmatic and it is known that a beam of this type passes substantially along two focal lines t and s known as the tangential focus and sagittal focus, one line being perpendicular to the principal section plane and the other line being located in said plane. The plane T corresponding to the so-called circle of least confusion is located at equal distance from the lines t and s. The juxtaposed cells are located in said plane T which is perpendicular to the central ray.

FIG. 1 shows a memory plane $P_2$ which is displaced with respect to the focal point $S_2$. In this case the reflected beam is no longer autocollimated and the light spot in the plane T will be deformed.

FIG. 2 is a schematic illustration of the focusing control device which is similar to the device described in U.S. Pat. No. 4,079,247 cited earlier.

The square cells 31, 32, 33 and 34 are juxtaposed so as to form a large square. The diagonal line 12 of said large square is placed in the principal section plane of the prism 1. When there is perfect focusing of the lens L on the memory plane, the light spot 8 is a circle.

In the event of defocusing of the lens L, either the spot 82 or the spot 81 becomes elongated along the diagonal line 12 or 11 as shown in dashed outline in the figure, depending on whether the point $S_2$ is located in front of, or behind, the memory plane.

The signals delivered by the diagonally opposite cells 31 and 32 are added in a circuit 35 and the signals delivered by the cells 32 and 33 are added in a circuit 36.

The output signals of the circuits 35 and 36 are applied to a differential amplifier 37 which delivers the correction signal S.

The value of said signal S can be read from a measuring instrument 38. Finally, said signal S is applied to the servo-control motor for adjusting the distance from lens L to image. The arrows in FIG. 2 show the two directions of travel of the lens L, said directions being dependent on the sign of the signal S.

Optimization of the system is achieved, for example, by setting a value on the distance of astigmatism ts (shown in FIG. 1). Angles of incidence of 45° on the face AB of the prism 1 are usually adopted. The angle $\gamma$ of the prism can be calculated if the point of convergence $S_3$ of the reflected beam and the distance $E = M_1A$ are known, or else said angle $\gamma$ is adopted and the distance E is then determined. Calculations performed on astigmatic beams through plane refracting surfaces are described in all treatises on geometrical optics.

The novel optical sensor presented in the foregoing description and employed for focusing control of a lens is intended to permit reading of an optical memory and more particularly of a videodisk.

What is claimed is:

1. In an optical recording system including a movable recording medium, an optical source and a lens for focusing an optical beam from said optical source on said recording medium, means for controlling the position of said lens, said means for controlling comprising:

refracting means having first and second planar faces, said first planar face being positioned for reflecting said optical beam, said reflected beam passing through said lens for focusing on said recording medium, a portion of said reflected and focused beam being reflected back through said lens and transmitted through said refracting means, said refracting means being arranged to astigmatize said reflected and focused beam to form an astigmatized beam defining a circle of least confusion;

photoelectric means for detecting in a first plane an elongation of a spot projected on said first plane by said astigmatized beam and outputting an electric a signal representative of a degree and direction of said elongation.

2. The system of claim 1 wherein said refracting means is a prism of refracting material.

3. The system of claim 1 wherein said means for detecting comprising four juxtaposed photoelectric cells positioned in said first plane; and servo means for moving said lens in response to a value of said electric signal, so as to change a lens-to-recording medium distance.

4. The system of claim 1, wherein the movable recording medium is a video disk.

5. The system of claim 1, wherein the four cells have a substantially square shape and are juxtaposed in order to form a second square, wherein diagonally opposite cells of the second square are connected to separate adding circuits, and wherein said adding circuits are connected to a differential amplifier for providing a correction signal and said amplifier is connected to the servo means for adjusting the lens-to-recording medium distance.

6. The system of claim 1, wherein the optical source is a laser.

* * * * *